United States Patent

Rustako, Jr. et al.

[15] 3,693,088

[45] Sept. 19, 1972

[54] DIVERSITY SYSTEM FOR MOBILE RADIO USING FADE RATE SWITCHING

[72] Inventors: Anthony Joseph Rustako, Jr., Colts Neck; Yu Shuan Yeh, Spotswood, both of N.J.

[73] Assignee: Bell Telephone Laboratories, Incorporated, Murray Hill, N.J.

[22] Filed: Dec. 29, 1970

[21] Appl. No.: 102,422

[52] U.S. Cl. ....................325/56, 325/304, 343/176, 343/177, 343/205

[51] Int. Cl. ..............................................H04b 7/08

[58] Field of Search......343/175, 176, 177, 208, 207; 325/4, 51, 53, 54, 56, 304, 370

[56] References Cited

UNITED STATES PATENTS

| | | | |
|---|---|---|---|
| 2,892,930 | 6/1959 | Magnuski | 325/56 |
| 2,159,647 | 5/1939 | Alford | 325/154 |
| 3,329,901 | 7/1967 | Case | 325/370 |
| 3,401,340 | 9/1968 | Cronburg, Jr. et al. | 325/304 |

*Primary Examiner*—Benedict V. Safourek
*Attorney*—R. J. Guenther and E. W. Adams, Jr.

[57] ABSTRACT

A mobile radio system having a plurality of base station transmitting antennas for each channel. When the mobile receiver encounters a fading signal level from the antenna then in use, it transmits an out of message band signal back to the base station which commands the base to switch to a different antenna thus providing diversity on the base to mobile link. Particular circuits are provided to discriminate between rapid Rayleigh fades and slow shadowing fades and to transmit a command for an antenna switch based on the Rayleigh fades.

12 Claims, 3 Drawing Figures

INVENTORS
A.J. RUSTAKO, JR.
Y. S. YEH
BY Roy M. Porter Jr.
ATTORNEY

DIVERSITY SYSTEM FOR MOBILE RADIO USING FADE RATE SWITCHING

BACKGROUND OF THE INVENTION

This invention relates to mobile radio systems having diversity transmitting and receiving capabilities and more particularly to a system having two way space diversity between a multiple antenna base station and a single antenna mobile station.

Radio signals are always subject to fading due to natural phenomena, but when one station of a radio link is mobile and moving at variable speeds through various and unpredictable environments, the situation is seriously compounded. In such a situation there are two types of received signal level variations observed. First there is the rapid multipath Rayleigh type fading due to different path cancellations and then there is a slower variation in the mean signal level due to gross path variations from building shadowing and other terrain effects. Both types of signal level variations are functions of speed.

Space diversity has been found to provide one of the best solutions to mobile radio fading. For example, if the base station has two or more spaced receiving antennas, the probability is great that one of these will receive an acceptable signal from a given mobile station even while another antenna does not. Diversity transmission from the base to the mobile is not so easily obtained because multiple and spaced receiving antennas on the mobile are not practical. On the other hand, diversity systems having two or more simultaneously radiating transmitting locations and only one receiving antenna require either two channels or, alternatively or at the same time, complex transmitter phasing circuits.

SUMMARY OF THE INVENTION

In accordance with the invention, diversity transmission from the base to the mobile is provided by switching between two spaced base transmitting antennas on command from the mobile. More particularly, means are provided at the mobile station for determining when the signal level then being received by the mobile from a given base station antenna falls below a level which depends upon the nature of the fade itself. When this occurs, the mobile transmits an out of message band signal back to the base which causes the base to switch to a different antenna. Diversity for transmission from the mobile to the base may then be provided by spaced base antennas in the usual way. Thus, diversity is provided for both directions of transmission but with system that simplifies apparatus complications.

Specialized circuits in accordance with features of the invention are provided to distinguish between the rapid multipath fading for which an antenna switch would be appropriate and the slower type of variation for which a switch is not desired.

DETAILED DESCRIPTION

Figure 1:
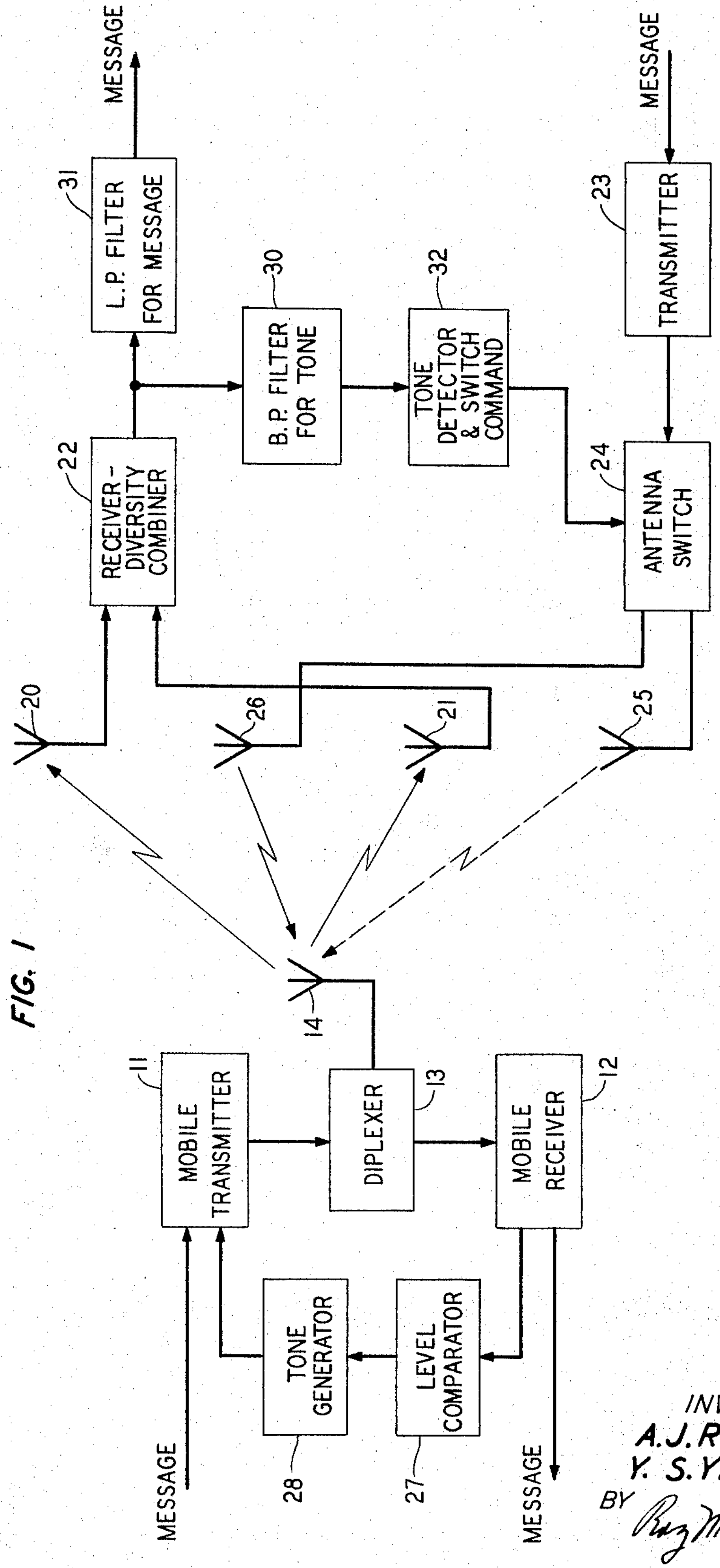
FIG. 1 is a block diagram of components making up a mobile station and a base station in accordance with the invention.

Referring more particularly to FIG. 1, components making up a system in accordance with the invention are illustrated by way of a block diagram. Conventional components which are found in any mobile radio system, and therefore need not be described in detail, include mobile transmitter 11 and receiver 12, both interconnected by diplexer 13 to a single mobile antenna 14. Similarly, the base station includes a plurality of spaced receiving antennas 20 and 21 the signals from which are suitably combined in diversity receiver 22. The base station further includes the transmitter 23 alternately feeding through antenna switching unit 24 one of at least a pair of spaced transmitter antennas 25 and 26.

Circuits in accordance with the invention in the mobile unit include a level comparator 27 which senses the level of the signals received by mobile receiver 12 and compares them with a predetermined reference level either fixed or variable as will be described hereinafter in connection with FIGS. 2 and 3. If comparator 27 determines that the received level is dropping through and below the reference level, an indication thereof will be transmitted to tone generator 28 which adds an out of band tone, specifically, a tone of finite duration in the form of a burst at a frequency above the message signal band, to the modulation transmitted on the carrier radiated by transmitter 11 and antenna 14.

The modulated carrier is received by antennas 20 and 21, suitably combined, and the modulation thereof detected in receiver 22. The higher frequency tone burst is separated by bandpass filter 30 and low pass filter 31 (the latter passing the message signal), and the presence of the tone detected by detector-command circuit 32. A signal is then transmitted to switching circuit 24 which alternately connects the output of transmitter 33 to antenna 25 or 26. Detector-command circuit 32 together with switch 24, should have a bistable operation such that a particular antenna is connected to the transmitter for a fixed minimum period after a tone burst is received and then is switched to the other antenna by a following tone burst received after the fixed period. The fixed period is provided simply to avoid instabilities that might be caused by transmission delays or momentary interruptions.

Summarizing the overall operation of the system shown in FIG. 1, a message signal is to be transmitted by transmitter 23. Switch 24 is initially assumed to connect the signal to antenna 26. When received by mobile antenna 14 and mobile receiver 12, a portion of the signal is applied to comparator 27. When the signal falls below an acceptable level, the base station is commanded to make an antenna switch by a tone on the carrier returned by mobile transmitter 11 to base receiver 22. Antenna switch 24 then disconnects antenna 26 and connects antenna 25 in place thereof to transmitter 23.

Assuming that the signals from antennas 25 and 26 have similar mean levels, but independent fading patterns, the probability can be shown to be high that the new signal will be acceptable. If it is not, however, at least two basic switching strategies are possible. One strategy would be to switch again if the second signal is not improved after an appropriate delay time. A second would be to stay with the second signal regardless of its strength until it rises above the reference level and then switch only if the second signal crosses the reference level in a negative direction. Circuits suitable for either of these strategies will occur to those skilled in the art. However, a particularly advantageous circuit operating in accordance with these strategies will be described with reference to FIG. 3.

Attention will now be given to the requirements of level comparator 27 in accordance with particular features of the invention. Before considering the circuit, however, a more detailed examination of the nature of mobile radio fades will be useful. Thus, curve 41 of FIG. 2 represents a typical signal level received by a moving receiver over a period of time. The rapid fades such as 42 are of the Rayleigh type and are caused by portions of the transmitted signal arriving at the receiver over different paths with phases that tend to cancel. As the receiver moves the phases periodically shift into a more nearly in phase condition which causes an increase in signal level. Obviously, as the velocity of movement is increased, the fades become shorter in duration and more rapid in occurrence. Curve 43 represents the mean signal level carrying through the rapid fades. Longer term fades in the mean signal level itself occur when the radio energy is effectively blocked or scattered by buildings or terrain. These fades are also functions of speed. Such a fade is indicated at point 44.

Since the rapid fades are superimposed upon the long fades it is apparent that no simple level comparison will be satisfactory in comparator 27. If the level is set at some predetermined fixed threshold such as 45 on FIG. 2, it will be apparent that improvement can then be afforded to only a very few of the rapid fades as represented by 47.

In accordance with the invention a mean level of signals subject to fast fades to the exclusion of the effect of slow fades is determined. This mean level is represented by curve 43. A reference level for switching as represented by curve 46 is then set a predetermined amount below the mean level. If this amount is too small switching will be commanded more often than is required and if the amount is too large insufficient switching will be commanded. With proper choice switching will be commanded on all of the deeper fast fades such as 42. In addition, the fixed threshold 45 is provided so that when the reference level 46 drops below threshold 45 during slow fades, threshold 45 overrides level 46 so as to command switching on short fades such as 47 which coincide with the slow fade 44.

The determination of the mean level curve 43 requires an integration of the instantaneous envelope over a period which depends upon vehicle speed. The integration period must be short enough to exclude the slow fades and must be further shortened when the vehicle is moving faster and the slow fades are more closely spaced in time. On the other hand, the period must at all times be long enough so as not to follow the rapid Rayleigh fades.

Figure 3:
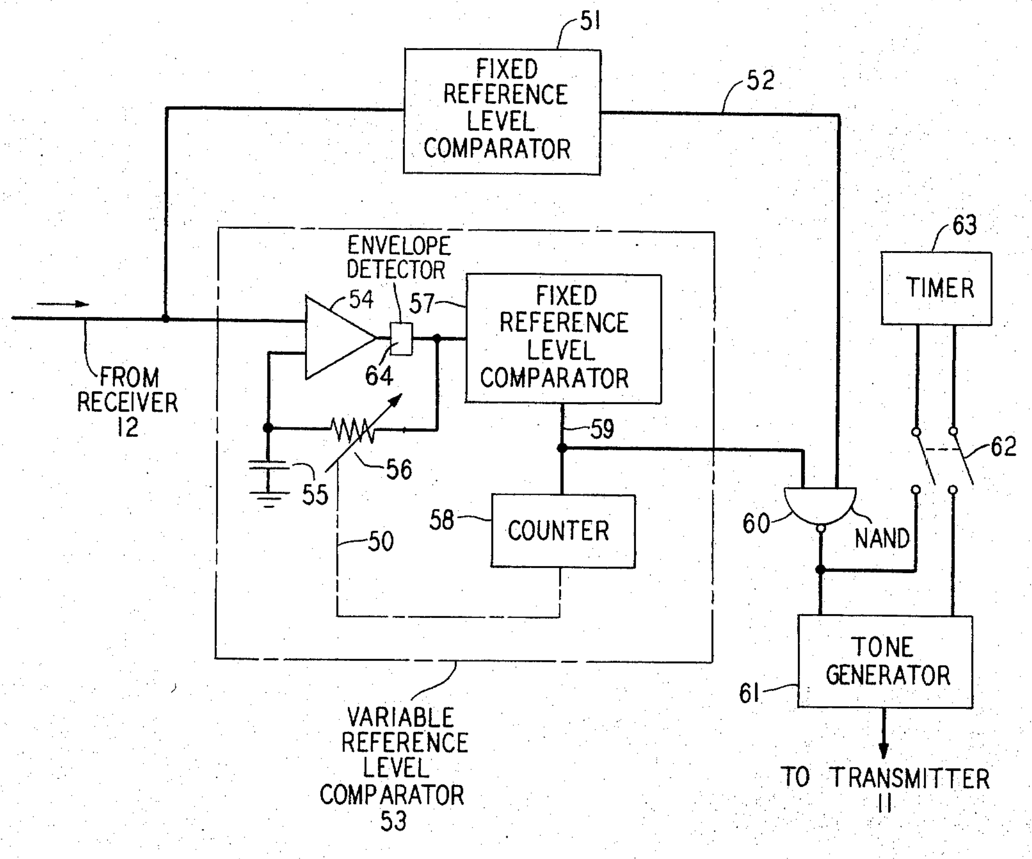
FIG. 3 shows in block diagram form further details in accordance with features of the invention of a level comparator suitable for use in FIG. 1

Referring now to FIG. 3 all of these objectives are met in the circuit comprising a fixed reference level comparator 51 of conventional design set to provide a direct current signal output or "1" on lead 52 when the signal received from receiver 12 is above a fixed threshold such as reference level 45 and a "0" when the signal falls below this level. Comparator 51 thus primarily provides an indication of a fade below a predetermined threshold level 45. Variable reference level comparator 53 on the other hand normalizes the shadowing fades and provides an indication of the rapid fades. More specifically, comparator 53 includes an automatic gain control amplifier 54, the AGC path of which includes an envelope detector 64 and a variable time constant RC circuit provided by capacitor 55 and a variable impedance 56 the impedance of which is under the control of the signal on lead 50. Thus, impedance 56 represents any one of the many known voltage variable resistors such as diode variolossers, electromechanical variable impedances and other devices such as those sold commercially by Raytheon under the trade name Rayistor.

Provided the time constant of RC circuit 55–56 is at all times long compared to the period of the short fades and short compared to the period of the long fades, the output of amplifier 54 will be normalized for long fades, that is, will be held constant despite the long fades. A fixed reference comparator 57, similar to comparator 51, is connected to the output of amplifier 54 and provides a "1" indication in its output on lead 59 when the fast fade signal exceeds the reference therein, which can now be set to a suitable level below the mean signal level of the fast fades after eliminating the effects of slow fades. However, since both the fast and slow fades are functions of speed, the RC time constant 55–56 itself must be a function of speed. In accordance with the invention, an indication of speed is obtained by counting the fast fades in counter 58, the output of which on lead 50 is a function of the number of such fades per unit time. As the rate of fades increases due to an increase in speed, the value of impedance 56 is decreased thereby decreasing the time constant of RC circuit 55–56 and shortening the period over which slow fades will be normalized.

Since a "1" at the output of comparator 51 on lead 52 indicates an acceptable signal relative to a fixed threshold level and a "1" at the output of comparator 57 on lead 59 indicates an acceptable signal relative to the mean signal level, these indications are then combined in a NAND gate 60, such that if either or both indications become "0", a "1" output will be received from gate 60. The output from gate 60 in turn triggers tone generator 61 which produces a signal burst lasting for a predetermined time after being triggered by a "0" to "1" transition at its input. Note that a further burst will not be produced until both levels have first returned to acceptable or "1" and then either again falls below acceptable or "0". This operation is in accordance with the switch and stay philosophy described above. In a typical situation the mean signal can be assumed to be generally acceptable, that is, above levels 45 and 46 of FIG. 2. Thus, the base station antenna will be commanded to switch each time a short fade such as 42 falls below the signal level 46 or the fixed level 45.

Figure 2:
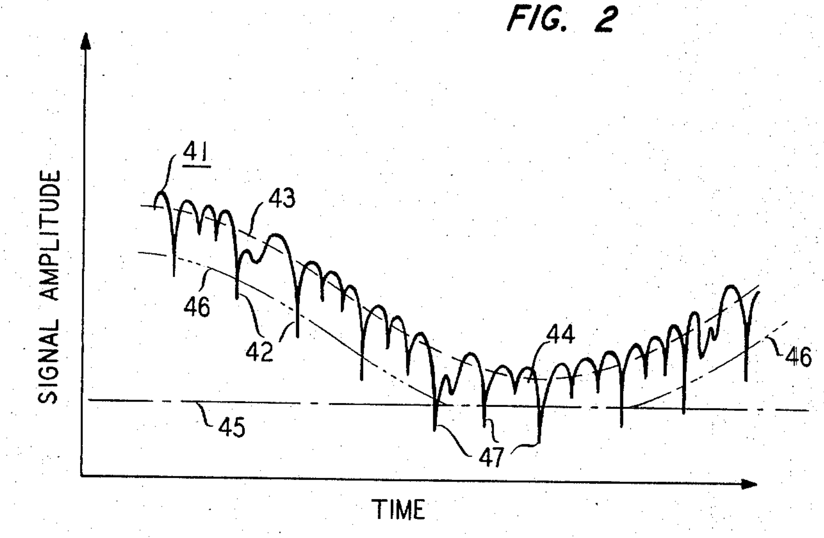
FIG. 2 is a plot of signal amplitude over a period of time of a signal subject to both rapid and slow fading.

A special situation is presented if movement of the receiver is stopped in a region of unacceptable signal, as 47 of FIG. 2, and there is a probability that a better signal might be provided if a base station antenna switch could be made. To alleviate this possibility FIG. 3 illustrates an option made effective by closing switch 62. This introduces timer 63 between the output of gate 60 and tone generator 61. Recognizing that an existing unacceptable signal is indicated by "1" in the gate 60 output, this indication is employed to start timer 63. After a predetermined interval, for example, in the order of 1 second, timer 63 again triggers tone generator 61 to call for a further antenna switch. If desired, timer 63 may be arranged to repetitively trigger tone generator 61 at predetermined intervals until an acceptable signal is again received or until normal periodic commands for antenna switching are again received indicating that the receiver is now moving.

Experience has indicated that two antennas are generally enough to provide adequate diversity. However, it should be understood that it is within the scope of the present invention to switch on command from the mobile in sequence among three or more antennas.

To improve only fast fades the antennas need not be widely spaced and can generally be included with a given base station location. To improve the shadowing fades, on the other hand, it is often necessary to space the antennas hundreds of feet apart. Switching antennas having this spacing would produce phase transient because of the R.F. phase of the new channel might be different from the old channel. The phase transient, after F.M. demodulation, occurs as clicks in the audio output. However, since the transient occurs only during antenna switching and is of short duration, i.e., 100 $\mu$sec or on that order, the F.M. discriminator output can be muted during this period and if required, an estimation to the audio output can be inserted at the same time. Muting and estimation circuits are well known in the art, the latter typically including circuits for holding over the audio output existing before the beginning of the muting. Since speech has a correlation time much longer than the phase transient duration, the result would be an audio output with very little distortion due to muting. Furthermore, the phase transient noise is greatly reduced if not eliminated.

What is claimed is:

1. A mobile radio system including at least one mobile station and at least one base station, said base station having a plurality of spaced transmitting antennas, a mobile radio receiver, means in the output of that receiver and responsive to a fading level of the signal being received in that output as compared with an integrated level of that signal for transmitting a tone modulation to said base, and means at said base and responsive to said tone modulation for switching from one to another of said antennas.

2. The system according to claim 1 including means on said mobile for determining a mean level of signals subject to fast fades to the exclusion of other fades slower than said fast fades and means for transmitting said tone when the level of said signals drops a given amount below said mean level.

3. The system according to claim 2 including further means on said mobile for determining when the level of said signals falls below a fixed reference level and means for transmitting said tone when the level of said signals either drops a given amount below said mean level or said fixed level.

4. The system according to claim 2 wherein said means for determining said mean level includes an automatic gain control amplifier having a time constant that is long compared to the period of said fast fades and short compared to the period of said other fades.

5. The system according to claim 4 wherein said time constant is variable and includes means for varying said time constant in response to the rate of occurrence of said fast fades.

6. A mobile radio system including at least one mobile station and at least one base station, at least one of said stations having a plurality of spaced antennas, means on said mobile for determining a mean level of signals subject to fast fades to the exclusion of other fades slower than said fast fades, and means for switching from one to another of said antennas when the level of said signals derived by the utilization of said one antenna drops below a reference level a given amount below said mean level.

7. The system according to claim 6 including means responsive to the signal derived by the utilization of said other antenna and the level thereof being below said reference level for switching after a delay period from said other antenna back to said one antenna.

8. The system according to claim 6 including means responsive to the signal derived by the utilization of said other antenna and the level thereof dropping through said reference level for switching from said other antenna to said one antenna.

9. A mobile radio system including at least one mobile station and at least one base station, at least one of said stations having antenna means adapted for at least two modes of diversity transmission, means at one of said stations for determining a mean level of signals subject to fast fades to the exclusion of other fades slower than said fast fades, and means for switching from one to another of said modes of transmission when the level of said signals derived by the utilization of said one antenna drops a given amount below said mean level.

10. In a mobile radio receiver adapted to be used in a communications system having at least two modes of diversity transmission, a radio receiver, means connected to the output of said receiver for deriving the mean level of the signals received at the input of said receiver, means for determining when the signals received in one of said modes drops a given amount below said mean level, and means for switching thereupon to another of said modes.

11. A mobile radio transmitter-receiver including a radio receiver, means connected in the output of said receiver for deriving the mean level of the signals received at the input of said receiver during a period, means for determining when the signals received from a given transmission path fall below the mean signal level related to that path, means for establishing a reference level a given amount below said mean level, and means associated with said receiver for effecting a change from said given transmission path when the signal received thereover drops below said reference level.

12. The transmitter-receiver of claim 11 including means for counting occurrences of said signal falling below said mean level and means for shortening said period as the rate of occurrence increases.

* * * * *